United States Patent
Liu et al.

(10) Patent No.: US 10,165,579 B2
(45) Date of Patent: Dec. 25, 2018

(54) METHODS RADIO NETWORK NODES AND USER EQUIPMENT FOR ALLEVIATING INTERFERENCE IN A RADIO COMMUNICATION NETWORK

(71) Applicant: Telefonaktiebolaget L M Ericsson (publ), Stockholm (SE)

(72) Inventors: Jinhua Liu, Beijing (CN); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 378 days.

(21) Appl. No.: 14/771,730

(22) PCT Filed: Mar. 14, 2013

(86) PCT No.: PCT/CN2013/072568
§ 371 (c)(1),
(2) Date: Aug. 31, 2015

(87) PCT Pub. No.: WO2014/139112
PCT Pub. Date: Sep. 18, 2014

(65) Prior Publication Data
US 2016/0014791 A1  Jan. 14, 2016

(51) Int. Cl.
*H04W 72/08* (2009.01)
*H04B 7/26* (2006.01)
(Continued)

(52) U.S. Cl.
CPC ........ *H04W 72/085* (2013.01); *H04B 7/2656* (2013.01); *H04W 24/08* (2013.01);
(Continued)

(58) Field of Classification Search
None
See application file for complete search history.

(56) References Cited

U.S. PATENT DOCUMENTS

| 2007/0004423 A1* | 1/2007 | Gerlach | H04W 72/082 |
| | | | 455/452.2 |
| 2009/0081955 A1* | 3/2009 | Necker | H04W 16/04 |
| | | | 455/63.1 |

(Continued)

FOREIGN PATENT DOCUMENTS

| CN | 102149099 A | 8/2011 |
| CN | 102271414 A | 12/2011 |

(Continued)

OTHER PUBLICATIONS

3GPP TR 03.024 v0.4.0; Technical Report; 3rd Generation Partnership Project; Technical Specification Group Radio Access Network; Evolved Universal Terrestrial Radio Access Network(E-UTRAN); Carrier-Based Hetnet ICIC Use Cases and Solutions (Release 11)—Aug. 2012.

(Continued)

*Primary Examiner* — Hassan A Phillips
*Assistant Examiner* — Gautam Sharma
(74) *Attorney, Agent, or Firm* — Baker Botts, LLP

(57) ABSTRACT

Methods and radio network nodes (BS1, BS2) for alleviating interference on downlink radio signals in a victim User Equipment, UE (T1, T2), caused by uplink transmission from an aggressor UE (T2, T1). The interference occurs during a flexible subframe in which the direction of signal transmission is variable between uplink and downlink in different radio frames. A first radio network node (BS1) detects (4:1) that a first UE (T1) that is served by the first radio network node (BS1) is one of the victim and aggressor UEs. The first radio network node (BS1) identifies (4:2) a second radio network node (BS2) employing a subframe scheme such that uplink transmission from the aggressor UE may overlap at least partly with downlink reception in the victim UE during the flexible subframe. The first radio network node (BS1) sends (4:3) a notification to the second (Continued)

radio network node, indicating that the first UE is served by the first radio network node. The second radio network node (BS2) is thereby triggered to execute (4:5) an interference mitigation action for alleviating the interference when serving a second UE (T2) being the other one of the victim and aggressor UEs.

18 Claims, 6 Drawing Sheets

(51) Int. Cl.
    *H04W 24/08*     (2009.01)
    *H04W 52/24*     (2009.01)
    *H04W 52/36*     (2009.01)
    *H04W 72/04*     (2009.01)

(52) U.S. Cl.
    CPC ....... *H04W 52/243* (2013.01); *H04W 52/365* (2013.01); *H04W 72/0413* (2013.01); *H04W 72/082* (2013.01); *H04W 72/0426* (2013.01); *H04W 72/0446* (2013.01)

(56) References Cited

U.S. PATENT DOCUMENTS

| | | | | |
|---|---|---|---|---|
| 2009/0190541 | A1* | 7/2009 | Abedi | H04W 16/10 370/329 |
| 2010/0246456 | A1* | 9/2010 | Suo | H04B 7/2656 370/280 |
| 2011/0143793 | A1* | 6/2011 | Kim | H04B 7/024 455/501 |
| 2012/0164948 | A1* | 6/2012 | Narasimha | H04W 72/1215 455/63.1 |
| 2012/0257519 | A1* | 10/2012 | Frank | H04L 5/0035 370/252 |
| 2013/0044697 | A1 | 2/2013 | Yoo et al. | |
| 2013/0322235 | A1* | 12/2013 | Khoryaev | H04W 24/10 370/229 |
| 2014/0334353 | A1* | 11/2014 | Wei | H04W 72/1263 370/280 |
| 2016/0014791 | A1* | 1/2016 | Liu | H04W 72/082 370/252 |

FOREIGN PATENT DOCUMENTS

| | | |
|---|---|---|
| WO | WO 2012/102569 A2 | 8/2012 |
| WO | WO 2012/138273 A1 | 10/2012 |
| WO | WO 2013/017295 A1 | 2/2013 |
| WO | WO 2014/047786 A1 | 4/2014 |
| WO | WO 2014/047815 A1 | 4/2014 |

OTHER PUBLICATIONS

3GPP TSG RAN WG1 Meeting #72; St. Julian's, Malta; Source: Renesas Mobile Europe Ltd; Title: Discussions on Interference Mitigation Schemes for TDD UL-DL Reconfiguration (R1-130419)—Jan. 28-Feb. 1, 2013.
EPO Extended European Search Report for Application No./Patent No. 13877707.3-1857 / 2974488 PCT/CN2013072568—dated Oct. 21, 2016.
3GPP TSG RAN WG1 Meeting #72; St. Julian's, Malta; Title: Discussion on Interference Mitigation Schemes for TDD UL/DL Reconfigurations; Source: Research In Motion, UK Limited (R1-130388)—Jan. 28-Feb. 1, 2013.
PCT International Search Report for International Application No. PCT/CN2013/072568, dated Dec. 5, 2013.
3GPP TR 36.828 V2.0.0; Technical Report; 3rd Generation Partnership Project; Technical Specification Group Radio Access Network; Further Enhancements to LTE TDD for DL-UL Interference Management and Traffic Adaptation (Release 11), dated Jun. 2012.
CATR, MIIT; LTE evolution for Hotspot and Indoor (LTE-Hi), dated May 2012.
Summary of Office Action of SIPO, Chinese Patent Application No. CN2013/80071874.X dated Aug. 9, 2018 (includes translation).

\* cited by examiner

|   | 0 | 1 | 2 | 3 | 4 | 5 | 6 | 7 | 8 | 9 |
|---|---|---|---|---|---|---|---|---|---|---|
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |
TDD configurations
Subframe numbers
Time →
Fig. 1 (Prior art)
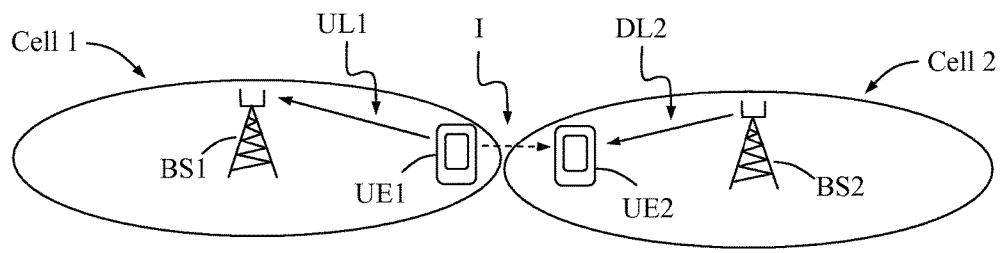
Fig. 2 (Prior art)
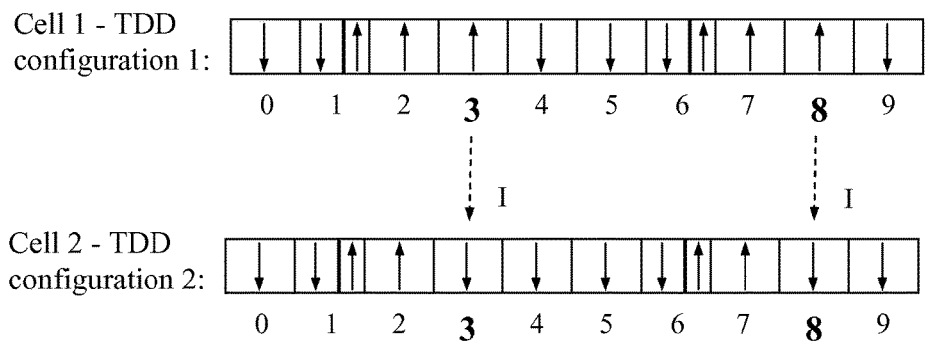
Fig. 3

METHODS RADIO NETWORK NODES AND USER EQUIPMENT FOR ALLEVIATING INTERFERENCE IN A RADIO COMMUNICATION NETWORK

PRIORITY

This nonprovisional application is a U.S. National Stage Filing under 35 U.S.C. § 371 of International Patent Application Serial No. PCT/CN2013/072568, filed Mar. 14, 2013, and entitled "METHODS RADIO NETWORK NODES AND USER EQUIPMENT FOR ALLEVIATING INTERFERENCE IN A RADIO COMMUNICATION NETWORK".

TECHNICAL FIELD

The present disclosure relates generally to methods, radio network nodes and a user equipment in a radio communication network for alleviating interference on downlink radio signals in a victim User Equipment (UE) located in a victim cell caused by uplink transmission from an aggressor UE located in an aggressor cell.

BACKGROUND

In a cellular network for radio communication, a Time Division Duplex (TDD) configuration of subframes may be used for uplink and downlink transmissions in cells where consecutive subframes are comprised in a repeatable radio frame. The subframes are reserved for uplink transmissions from User Equipments (UEs) to a serving base station and for downlink transmissions from the base station to the UEs such that uplink and downlink transmissions do not occur at the same time within the cell. A subframe is basically defined by a preset time period of a certain length, typically 1 millisecond (ms), and each subframe may comprise two time slots of 0.5 ms each. Further, a radio frame comprises a predefined number of consecutive subframes, e.g. ten subframes. In such a network, different base stations are able to use different configurations of subframes, e.g. depending on the current need for uplink and downlink bandwidth resources.

An example of different TDD configurations that can be used by base stations in different cells is shown in the table of FIG. 1 comprising seven different TDD configurations 0-6 each having ten subframes 0-9 including downlink subframes "D", uplink subframes "U" and so-called special subframes "S". The special subframes S are configured with one part reserved for downlink, another part reserved for uplink, and a guard period between the two parts allowing neither uplink nor downlink. It can be seen in this example that the first three subframes 0-2 and subframe 5 are reserved for downlink D, special S, uplink U, and downlink D, respectively, in all TDD configurations 0-6, while the remaining subframes 3, 4, 6-9 can vary in different TDD configurations. The latter subframes 3, 4, 6-9 may thus be referred to as flexible subframes.

In this disclosure, the term "flexible subframe" denotes a subframe in which the direction of transmission, i.e. downlink or uplink, may differ between different cells so that the flexible subframe is used for downlink in one cell and for uplink in another cell. Further, a flexible subframe may differ from one radio frame to another in the same cell so that the flexible subframe is used in the cell for downlink in one radio frame and for uplink in another radio frame. Thereby, transmissions in flexible subframes may, at least in some radio frames, cause interference between different neighboring cells as follows. It should be noted that a flexible subframe may also be a special subframe used partly for uplink transmissions and/or partly for downlink transmissions. In this disclosure, the expression "during a flexible subframe" should be understood as in the flexible subframe or in a subframe that overlaps in time with the flexible subframe depending on if the UE is served by the base station that applies the subframe scheme with the flexible subframe or if the UE is served by a neighboring base station that applies a subframe scheme with a subframe that overlaps or coincides in time with the flexible subframe.

When different TDD configurations are used in two neighboring cells, interference may occur across the cells during a flexible subframe where downlink is permitted in one cell and uplink is permitted in the other cell at the same time. In this description, the term "neighboring cells" means that they are close enough to one another so that transmissions in one cell can potentially cause interference in the other cell. Interference due to different TDD configurations in neighboring cells can be either 1) downlink to uplink interference when a downlink transmission from a base station of one cell disturbs an uplink reception in a base station of the other cell during a flexible subframe, or 2) uplink to downlink interference when an uplink transmission from a UE in one cell disturbs a downlink reception in a UE in the other cell during a flexible subframe. Of these two scenarios, 1) refers to interference between base stations which is more or less predictable and this interference can be controlled quite accurately since the base stations in the neighboring cells are in fixed positions relatively far away from each other such that downlink signals from one base station are not very strong when received in the other base station.

On the other hand, scenario 2) above refers to interference between UEs which is more unpredictable since the UEs move around and may sometimes be located quite near each other while being served by different base stations, e.g. when both are located close to the borders of their respective cells. This scenario is illustrated in FIG. 2 where a first UE denoted "UE1" is located near the border of a first cell 1 served by a first base station "BS1" using a TDD configuration allowing the UE1 to transmit uplink signals "UL1" in a certain subframe. At the same time, a second UE "UE2" is located near the border of a second cell 2 served by a second base station "BS2" using another TDD configuration allowing UE2 to receive downlink signals "DL2" in the same subframe, thus being a flexible subframe in this context. Since UE1 and UE2 are quite close to one another but relatively far away from their respective base stations, the uplink signals UL1 transmitted with high power from UE1 will interfere strongly with the relatively weak downlink signals DL2 received by UE2 during the flexible subframe. This UE to UE interference "I" is illustrated by a dashed arrow.

FIG. 3 shows two examples of TDD configurations which can cause UE to UE interference across neighboring cells 1 and 2. In cell 1, TDD configuration 1 of FIG. 1 is used and in cell 2, TDD configuration 2 of FIG. 1 is used. It can be seen in both of FIG. 1 and FIG. 3 that flexible subframes 3 and 8 are configured differently in the two cells such that they are uplink subframes in cell 1 and downlink subframes in cell 2, hence potentially causing UE to UE interference I from cell 1 to cell 2, illustrated by dashed arrows in FIG. 3. In this case, UE1 can be called an "aggressor UE" and UE2 can be called a "victim UE". Likewise, cells 1 and 2 can be called "aggressor cell" and "victim cell", respectively. It is thus a problem that, in a radio communication network allowing different TDD configurations with one or more flexible subframes in different cells, downlink radio signals received by a victim UE in a victim cell during a flexible subframe, may be subjected to interference caused by an uplink transmission from an aggressor UE in an aggressor cell during that subframe, e.g. depending on the relative distance and locations of the UEs which are typically unpredictable.

SUMMARY

It is an object of embodiments described herein to address at least some of the problems and issues outlined above. It is possible to achieve this object and others by using a method and a base station as defined in the attached independent claims.

According to one aspect, a method is provided to be performed by a first radio network node in a radio communication network where subframes are transmitted in pre-determined positions within radio frames. The first radio network node employs a subframe scheme where at least one of the pre-determined positions is allocated to a flexible subframe in which the direction of signal transmission is variable between uplink and downlink from one radio frame to another. The method can be used for triggering mitigation of interference on downlink radio signals received by a victim User Equipment, UE, in a victim cell, which interference is caused by transmission of uplink radio signals from an aggressor UE in an aggressor cell during the flexible subframe.

In this method, the first radio network node detects that a first UE, being one of the victim and aggressor UEs, is served by the first radio network node. The first radio network node further identifies a second radio network node which employs a subframe scheme such that an uplink transmission from the aggressor UE potentially overlaps at least partly with downlink reception at the victim UE during the flexible subframe. The first radio network node also sends a notification to the identified second radio network node. The notification indicates the flexible subframe and the first UE being served by the first radio network node, and the notification is sent to trigger the second radio network node to execute an interference mitigation action for alleviating the interference when a second UE, being the other one of the victim and aggressor UEs, is served by the second radio network node during the flexible subframe.

Thereby, UE to UE interference can be discovered and the potentially harmful effects of the UE to UE interference can be avoided or at least limited by triggering the second radio network node to execute an interference mitigation action for alleviating the interference when it is warranted.

According to another aspect, a first radio network node is provided in a radio communication network where subframes are transmitted in pre-determined positions within radio frames. The first radio network node is configured to employ a subframe scheme where at least one of the pre-determined positions is allocated to a flexible subframe in which the direction of signal transmission is variable between uplink and downlink from one radio frame to another. The first radio network node is configured to trigger mitigation of interference on downlink radio signals received by a victim User Equipment, UE, in a victim cell, which interference is caused by transmission of uplink radio signals from an aggressor UE in an aggressor cell during the flexible subframe. The first radio network node comprises a detecting unit configured to detect that a first UE, being one of the victim and aggressor UEs, is served by the first radio network node. The first radio network node comprises an identifying unit configured to identify a second radio network node which employs a subframe scheme such that an uplink transmission from the aggressor UE potentially overlaps at least partly with downlink reception at the victim UE during the flexible subframe.

The first radio network node also comprises a sending unit configured to send a notification to the identified second radio network node. The notification indicates the flexible subframe and the first UE which is served by the first radio network node. The sending unit is configured to send the notification to trigger the second radio network node to execute an interference mitigation action for alleviating the interference when a second UE, being the other one of the victim and aggressor UEs, is served by the second radio network node during the flexible subframe.

According to another aspect, a method is provided to be performed by a second radio network node in a radio communication network where subframes are transmitted in pre-determined positions within radio frames, wherein a first radio network node in the radio communication network employs a subframe scheme where at least one of the pre-determined positions is allocated to a flexible subframe in which the direction of signal transmission is variable between uplink and downlink from one radio frame to another. This method can be used for alleviating interference on downlink radio signals received by a victim User Equipment, UE, in a victim cell, which interference is caused by transmission of uplink radio signals from an aggressor UE in an aggressor cell during the flexible subframe.

In this method, the second radio network node receives a notification from the first radio network node, which notification indicates that an uplink transmission from the aggressor UE potentially overlaps at least partly with downlink reception in the victim UE during the flexible subframe, and that a first UE, being one of the victim and aggressor UEs, is served by the first radio network node. The second radio network node further detects that a second UE, being the other one of the victim and aggressor UEs, is served by the second radio network node. The second radio network node also selects an interference mitigation action for the detected second UE based on the received notification, and then executes the selected interference mitigation action.

According to another aspect, a second radio network node is provided in a radio communication network where subframes are transmitted in pre-determined positions within radio frames, and where a first radio network node in the radio communication network employs a subframe scheme where at least one of the pre-determined positions is allocated to a flexible subframe in which the direction of signal transmission is variable between uplink and downlink from one radio frame to another. The second radio network node is configured to alleviate interference on downlink radio signals received by a victim User Equipment, UE, in a victim cell, which interference is caused by transmission of uplink radio signals from an aggressor UE in an aggressor cell during the flexible subframe.

The second radio network node comprises a receiving unit configured to receive a notification from the first radio network node. This notification indicates that an uplink transmission from the aggressor UE potentially overlaps at least partly with downlink reception in the victim UE during the flexible subframe, and that a first UE, being one of the victim and aggressor UEs, is served by the first radio network node. The second radio network node further comprises a detecting unit configured to detect that a second UE, being the other one of the victim and aggressor UEs, is served by the second radio network node. The second radio network node also comprises a logic unit configured to select an interference mitigation action for the detected second UE based on the received notification, and a mitigating unit configured to execute the selected interference mitigation action.

According to another aspect, a method is provided to be performed by a User Equipment, UE, served by a serving radio network node in a radio communication network where subframes are transmitted in pre-determined positions within radio frames, and wherein at least one of the serving radio network node and a neighbouring radio network node in the radio communication network employs a subframe scheme where at least one of the pre-determined positions is allocated to a flexible subframe in which the direction of signal transmission is variable between uplink and downlink from one radio frame to another. This method can be used for alleviating interference on downlink radio signals received by a victim UE in a victim cell, which interference is caused by transmission of uplink radio signals from an aggressor UE in an aggressor cell during the flexible subframe.

In this method, the UE receives a notification from the serving radio network node, which notification indicates that the UE is one of the victim and aggressor UEs. The UE further executes an interference mitigation action based on the received notification.

According to another aspect, a UE is configured to be served by a serving radio network node in a radio communication network where subframes are transmitted in pre-determined positions within radio frames, wherein at least one of the serving radio network node and a neighbouring radio network node in the radio communication network employs a subframe scheme where at least one of the pre-determined positions is allocated to a flexible subframe in which the direction of signal transmission is variable between uplink and downlink from one radio frame to another. The UE is also configured to alleviate interference on downlink radio signals received by a victim UE in a victim cell, which interference is caused by transmission of uplink radio signals from an aggressor UE in an aggressor cell during the flexible subframe.

The UE comprises a receiving unit configured to receive a notification from the serving radio network node, which notification indicates that the UE is one of the victim and aggressor UEs. The UE also comprises an executing unit configured to execute an interference mitigation action based on the received notification.

The above methods, radio network nodes and UE may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which:

FIG. 1 is a diagram with different TDD configurations of subframes, according to the prior art.

FIG. 2 is a communication scenario illustrating inter-cell interference, according to the prior art.

FIG. 3 is a diagram illustrating an example of how different TDD configurations can be used in two cells, according to some possible embodiments.

DETAILED DESCRIPTION

In this disclosure, the term "radio network node" is used to represent a node of a wireless or cellular network which node is capable of communicating with wireless UEs over radio channels. Depending on the terminology used, a radio network node may also be called base station, NodeB, eNodeB, eNB, base transceiver station, relay node, and so forth. Further, the term User Equipment, or UE, is used here to represent any terminal or device capable of communicating with the above radio network node and network over radio channels. Without limitation, the UE may be a handheld device operated by a human user or an automatically operating device sometimes referred to as a Machine-to-Machine (M2M) device.

Briefly described, a solution is provided to alleviate interference on downlink radio signals received by a victim UE in a victim cell, being caused by transmission of uplink radio signals from an aggressor UE in an aggressor cell, in a network where flexible subframes may be used in different cells, e.g. by using different TDD configurations. As mentioned above, a flexible subframe is a subframe in which the direction of signal transmission may change between uplink and downlink in different radio frames. Therefore, interference between UEs in different cells may potentially occur during such a flexible subframe when one UE sends signals and another UE receives signals at the same time. In this solution, it has been realized that it can be efficient for a radio network node, e.g. a base station, to detect when either of the victim and aggressor UEs is served by that radio network node and to send a notification to a second radio network node identified as serving the other UE, to indicate the flexible subframe and the detection of the first UE. Thereby, the second radio network node will be triggered to execute an interference mitigation action for alleviating the interference, which will be described in more detail below.

Figure 4:
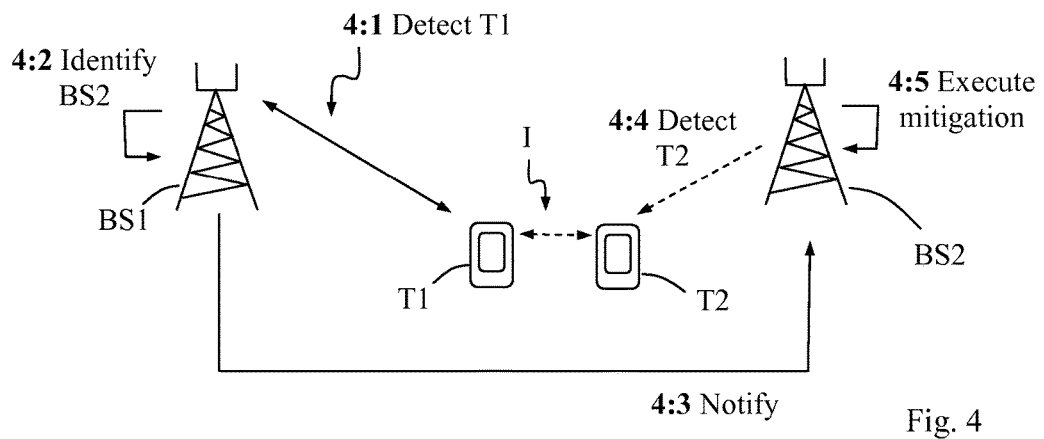
FIG. 4 is a communication scenario according to some possible embodiments.

An exemplifying procedure is illustrated by the scenario in FIG. 4 in which a first UE T1 is served by a first radio network node BS1 in one cell and a second UE T2 is served by a second radio network node BS2 in another cell, wherein subframes are transmitted in pre-determined positions within radio frames. It is assumed that the first radio network node BS1 employs a subframe scheme where at least one of the pre-determined positions is allocated to a flexible subframe in which the direction of signal transmission is variable between uplink and downlink from one radio frame to another, i.e. the direction of signal transmission may change between uplink and downlink in different radio frames. Further, the direction of signal transmission may at the same time be different in any other neighbouring radio network node, such as BS2, during such a flexible subframe.

The UEs T1 and T2 are involved in an interference situation which occurs during a flexible subframe where one of T1 and T2 is an aggressor UE causing the interference "I" and the other one of T1 and T2 is a victim UE suffering from the interference I, schematically illustrated by a dashed two-way arrow. Throughout this disclosure, it should be noted that interference caused by transmission "during a flexible subframe" is to be understood as interference that can occur in a subframe that at least partly overlaps in time with the flexible subframe. The interference can thus occur in either direction, i.e. from T1 to T2 or from T2 to T1 depending on which is the victim and which is the aggressor, respectively, and this example is intended to illustrate that both alternatives are possible. The radio network nodes BS1 and BS2 are illustrated as traditional base stations in this figure, although the example is not limited thereto.

A first action 4:1 illustrates that the first radio network node BS1 detects that the first UE T1, being served by BS1 during the flexible subframe, is one of the victim and aggressor UEs. For example, the first UE T1 may be detected by determining that the first UE is located in a cell border region adjacent to the cell of the second radio network node, thus being close enough to potentially cause or suffer from interference with the other cell. The cell border region is the outmost area of a cell around its serving radio network node and two UEs in adjacent cells may happen to be quite close to one another when located in respective cell border regions, as in the situation shown in FIG. 4. Some examples of how the cell border region can be determined will be described later below.

Another action 4:2 illustrates that the first radio network node BS1 identifies the second radio network node BS2 as being a node that employs a subframe scheme such that an uplink transmission from the aggressor UE may potentially overlap at least partly, e.g. coincide, with downlink reception at the victim UE during the flexible subframe. The subframe scheme employed by the second radio network node BS2 may also comprise a flexible subframe that coincides or overlaps at least partly in time with the flexible subframe of the first radio network node BS1. The second radio network node BS2 may for example be identified as follows. The first radio network node BS1 may determine which subframe schemes, for example TDD subframe configurations, are employed in a set of neighboring radio network nodes and may maintain a list of neighboring radio network nodes, i.e. radio network nodes located close enough to the first radio network node to potentially cause or suffer from inter-cell interference, which use a TDD subframe configuration different than the one used by the first radio network node BS1. The set of neighboring radio network nodes which use a different TDD subframe configuration thus include the second radio network node BS2 of this example.

The determination of the second network node BS2 can be performed by checking information about employed TDD configurations exchanged between the radio network nodes, e.g. over an X2 interface used in Long Term Evolution (LTE) networks. It should be noted that more than one neighboring radio network node may be identified which also employ at least one flexible subframe as described above, and the procedure described here can be applied for each one of any number of such neighboring radio network nodes.

Another action 4:3 illustrates that the first radio network node BS1 sends a notification to the identified second radio network node BS2, e.g. over an X2 interface in the case of LTE, to trigger BS2 to execute an interference mitigation action for alleviating the interference. The notification indicates the flexible subframe and that the first UE T1 being served by BS1 has been detected, and the notification is sent to effectively inform the second radio network node that the detected UE is being served by the first radio network node BS1. Having received the notification, the second radio network node BS2 detects in another action 4:4 that it is serving the second UE T2, being the other one of the victim and aggressor UEs. The second radio network node BS2 then executes the interference mitigation action for alleviating the interference, which is illustrated by another action 4:5.

The interference mitigation action taken by node BS2 may comprise different acts and measures, e.g. depending on whether the first UE T1 is the victim UE and the second UE T2 is the aggressor UE, or vice versa. For example, when the second UE T2 is the victim UE, the node BS2 may instruct the second UE T2 to apply multiple loop downlink channel filtering or multiple loop downlink link adaptation, such that the UE T2 can decode its received signals easier and more reliably. Further alternatives may include increasing power of the downlink transmission to the UE T2, and using a more robust modulation scheme, coding scheme, and/or transport format, which may likewise facilitate the decoding of received signals for the UE T2. On the other hand, when the second UE T2 is the aggressor UE, the node BS2 may instruct the second UE T2 to reduce its transmission power. Further examples will be described later below.

Further, when the first UE T1 is the aggressor UE transmitting uplink radio signals with data during the flexible subframe, the first radio network node BS1 may also contribute and execute an interference mitigation action to alleviate the interference. Some examples of acts and measures that the node BS1 can make in this case will be described later below.

Figure 5:
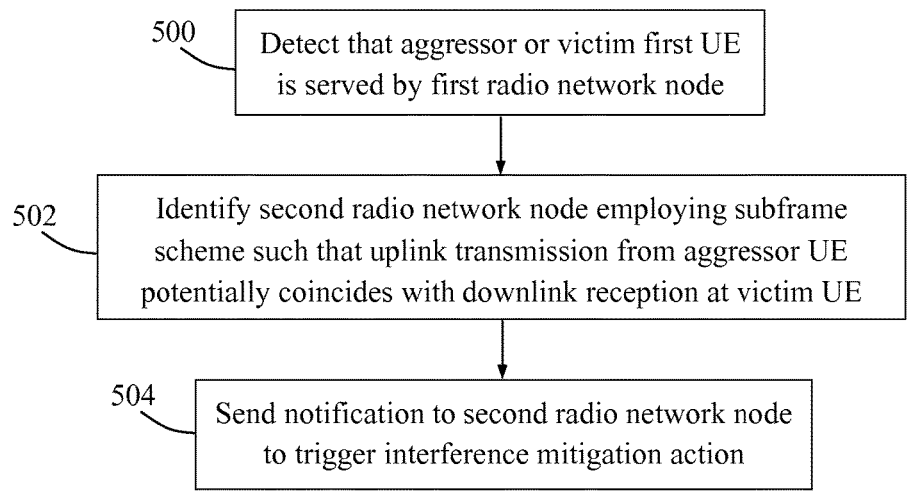
FIG. 5 is a flow chart illustrating a procedure in a first radio network node, according to further possible embodiments.

A procedure with actions performed by a first radio network node in a radio communication network where subframes are transmitted in pre-determined positions within radio frames, for triggering mitigation of interference, caused by transmission of uplink radio signals from an aggressor UE in an aggressor cell, on downlink radio signals received by a victim UE in a victim cell, will now be described with reference to the flow chart in FIG. 5. The first radio network node employs a subframe scheme where at least one of the pre-determined positions is allocated to a flexible subframe in which the direction of signal transmission is variable between uplink and downlink from one radio frame to another. The first radio network node may be the node BS1 in FIG. 4.

In a first action 500, the first radio network node detects that a first UE, being one of the victim and aggressor UEs, is served by the first radio network node. The first UE in this procedure may be the UE T1 in FIG. 4. In another action 502, the first radio network node identifies a neighbouring second radio network node which employs a subframe scheme such that an uplink transmission from the aggressor UE potentially overlaps at least partly with downlink reception at the victim UE during the flexible subframe. The second radio network node may be the node BS2 in FIG. 4.

The first radio network node then sends a notification to the identified second radio network node, in a following action 504. The notification indicates the flexible subframe and the first UE being served by the first radio network node, to trigger the second radio network node to execute an interference mitigation action for alleviating the interference when a second UE, which may be T2 in FIG. 4, being the other one of the victim and aggressor UEs, is served by the second radio network node during the flexible subframe, or in a subframe that overlaps in time with the flexible subframe.

It is possible to perform the above procedure and actions in different optional ways. In a possible embodiment, the notification may be sent in action 504 after determining that a level of the interference during the flexible subframe is higher than a certain threshold based on measurements of signals communicated to or from the first UE. Thereby, the notification can be sent only when the interference mitigation action is needed due to the level of interference and not when the level of interference is lower than the threshold. For example, the level of the interference during the flexible subframe may be determined based on a measurable parameter called Signal over Interference and Noise Ratio (SINR) that can be determined for both uplink and downlink according to conventional methods which are known as such and therefore not necessary to describe here. In another possible embodiment, the subframe scheme employed by the second radio network node may comprise a flexible subframe that coincides or overlaps at least partly in time with the flexible subframe of the first radio network node, which has been explained above.

In another possible embodiment, as also mentioned in the example of FIG. 4, the first UE may be detected in action 500 when it is located in a cell border region of a first cell of the first radio network node adjacent to a second cell of the second radio network node. In yet an embodiment, the cell border region may be determined based on measurements of path loss between UEs served by the first radio network node and the first radio network node. In that case, the cell border region may be determined by comparing the measurements of path loss between the UEs served by the first radio network node and the first radio network node with measurements of path loss between UEs served by neighboring radio network nodes and their respective serving neighboring radio network nodes.

In another possible embodiment, the determination of the cell border region may further be based on additional measurements regarding the UEs served by the first radio network node. The additional measurements may comprise measurements of at least one of: power headroom (PH) of the UEs, transmit power of the UEs, received signal strength at the first radio network node, angle/direction of arrival (AoA/DoA), timing advanced (TA), and one way propagation delay. In more detail, the first radio network node may use these additional measurements for determining path loss when the first UE is in the cell border region or when a cell change is triggered for the first UE. For example, the first radio network node may measure the Angle of Arrival (AoA), also known as Direction of Arrival (DoA) on signal transmitted by the first UE when the first UE triggers a cell change from the first cell to the second cell served by the second radio network node.

Further, the first radio network node may measure the parameter known as Timing Advanced (TA) or one way propagation delay on signals transmitted by the first UE when the first UE triggers a cell change to the second cell served by the second radio network node. The DoA or AoA can even be measured by the first UE and reported to the first radio network node when the UE triggers cell change to the second cell. The first radio network node may also combine more than one measurement, e.g. any combination of Reference Signal Received Power (RSRP), AoA/DoA, PH, signal strength, etc., to further improve the accuracy in determining the cell border region which may at least partly overlap a similar cell border region of the second cell, where there is thus a potential risk for the above-described UE to UE interference.

In another possible embodiment, statistics of the above-described measurements of path loss and/or additional measurements may be maintained by the first radio network node in a look-up table for easy access when performing the actions above. Also, the first radio network node may include information about the above measurements of path loss and/or additional measurements in the notification sent to the second radio network node in action 504.

In yet another possible embodiment, the first radio network node may monitor interference, e.g. during the flexible subframe, for potential victim UEs located in the cell border region. In further possible embodiments, the first radio network node may identify a set of neighbouring radio network nodes which employ a direction of signal transmission during the flexible subframe that is opposite to the direction of signal transmission employed by the first radio network node during the flexible subframe, and further send the notification to one or more radio network nodes in the set of identified neighbouring radio network nodes.

In further possible embodiments, when the first UE is the aggressor UE transmitting uplink radio signals with data during the flexible subframe, i e in this case in the flexible subframe, also the first radio network node may execute an interference mitigation action for alleviating the UE to UE interference. The interference mitigation action executed by the first radio network node may in that case comprise at least one of:

scheduling low data rate to the first UE in the uplink,
decreasing transmission power of the first UE,
using a more robust modulation scheme for the first UE,
using a more robust coding scheme for the first UE, and
using a more robust transport format for the first UE.

One or more of the above measures can be used to avoid excessive signal power from the first UE which may contribute to making it easier for the second UE, being the victim UE in this case, to properly receive and decode downlink signals transmitted from the second radio network node, even when suffering from the interference caused by uplink transmission by the first UE being the aggressor UE.

Figure 6:
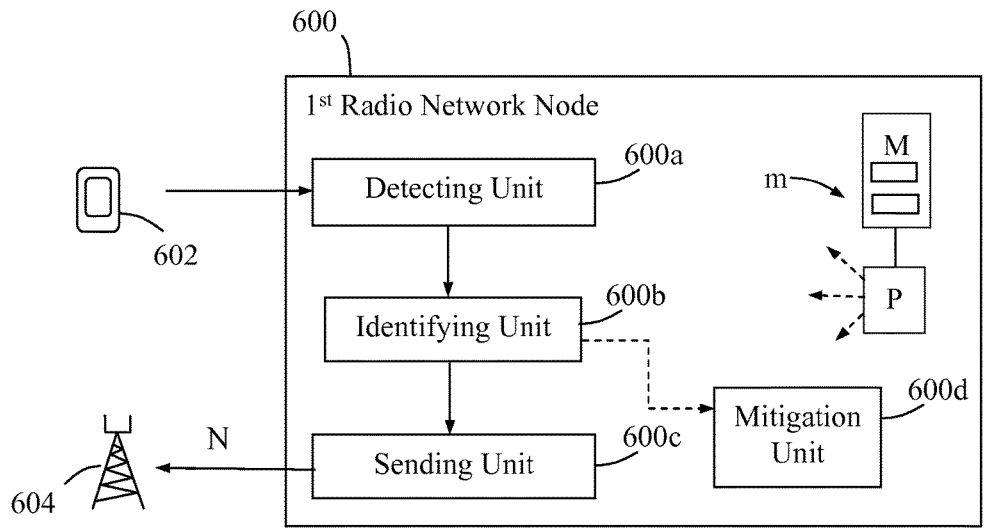
FIG. 6 is a block diagram illustrating a first radio network node in more detail, according to further possible embodiments.

A detailed but non-limiting example of how a first radio network node, in a radio communication network where subframes are transmitted in pre-determined positions within radio frames, may be arranged to accomplish the above-described embodiments, is illustrated by the block diagram in FIG. 6. The first radio network node 600 is configured to employ a subframe scheme where at least one of the pre-determined positions is allocated to a flexible subframe in which the direction of signal transmission is variable between uplink and downlink from one radio frame to another. The first radio network node 600 is also configured to trigger mitigation of interference on downlink radio signals received by a victim UE in a victim cell, the interference being caused by transmission of uplink radio signals from an aggressor UE in an aggressor cell during the flexible subframe, i.e. in a subframe that overlaps at least partly in time with the flexible subframe. The first radio network node 600 may act according to the procedures and features described above for any of FIGS. 4 and 5 and the examples shown in FIGS. 7-9 to be described further below. The first radio network node 600 will now be described in terms of a possible example of employing the solution.

The first radio network node 600 comprises a detecting unit 600a configured to detect that a first UE 602, being one of the victim and aggressor UEs, is served by the first radio network node 600. The first radio network node 600 also comprises an identifying unit 600b configured to identify a second radio network node 604 which employs a subframe scheme such that an uplink transmission from the aggressor UE potentially coincides or overlaps at least partly with downlink reception at the victim UE during the flexible subframe.

The first radio network node 600 also comprises a sending unit 600c configured to send a notification "N" to the identified second radio network node 604. The notification indicates the flexible subframe and the detection of the first UE being served by the first radio network node. The notification is sent to trigger the second radio network node to execute an interference mitigation action for alleviating the interference when a second UE, not shown, being the other one of the victim and aggressor UEs, is served by the second radio network node during the flexible subframe, i.e. in a subframe that overlaps at least partly in time with the flexible subframe, which will be described further below e.g. with reference to FIGS. 10 and 11. The first radio network node 600 may also comprise a mitigation unit 600d configured to execute an interference mitigation action for alleviating the interference, e.g. when the first UE is the aggressor UE transmitting uplink radio signals with data during the flexible subframe.

The first radio network node 600 and its functional units 600a-d may be configured or adapted to operate according to various optional embodiments. In a possible embodiment, the sending unit 600c may be further configured to send the notification after it has been determined that a level of the interference during the flexible subframe is higher than a threshold based on measurements of signals communicated to or from the first UE. In another possible embodiment, the detecting unit 600a may further be configured to detect the first UE 602 when it is located in a cell border region of the first radio network node adjacent to a cell of the second radio network node.

Further, the detecting unit 600a may be configured to determine the cell border region based on measurements of path loss between UEs served by the first radio network node and the first radio network node. In that case, the detecting unit 600a may further be configured to determine the cell border region by comparing the measurements of path loss between the UEs served by the first radio network node and the first radio network node with measurements of path loss between UEs served by neighboring radio network nodes and their respective serving neighboring radio network nodes. The detecting unit 600a may further be configured to determine the cell border region further based on additional measurements regarding the UEs served by the first radio network node. The additional measurements may comprise measurements of at least one of: power headroom PH, transmit power, received signal strength, angle/direction of arrival (AoA/DoA), timing advanced (TA), and one way propagation delay, e.g. in the manner described above. The detecting unit 600a may further be configured to maintain statistics of the measurements of path loss and/or additional measurements in a look-up table.

In other possible embodiments, the sending unit 600c may further be configured to include information about the measurements of path loss and/or additional measurements in the notification. The detecting unit 600a may further be configured to monitor interference for victim UEs located in the cell border region. The identifying unit 600b may further be configured to identify a set of neighbouring radio network nodes which employ a direction of signal transmission during the flexible subframe that is opposite to the direction of signal transmission employed by the first radio network node during the flexible subframe. In that case, the sending unit 600c may further be configured to send the notification to one or more radio network nodes in the set of identified neighbouring radio network nodes.

As mentioned above, the mitigation unit 600d may be configured to execute an interference mitigation action for alleviating the interference when the first UE is the aggressor UE transmitting uplink radio signals with data during the flexible subframe. The interference mitigation action may in that case comprise at least one of:
  scheduling low data rate to the first UE in the uplink,
  decreasing transmission power of the first UE,
  using a more robust modulation scheme for the first UE,
  using a more robust coding scheme for the first UE, and
  using a more robust transport format for the first UE.

The above alternatives have been described above and are not necessary to repeat here.

It should be noted that FIG. 6 illustrates various functional units in the radio network node 600 and the skilled person is able to implement these functional units in practice using suitable software and hardware. Thus, the solution is generally not limited to the shown structures of the radio network node 600, and the functional units 600a-d may be configured to operate according to any of the features described in this disclosure, where appropriate.

The functional units 600a-d described above can be implemented in the radio network node 600 by means of program modules of a respective computer program comprising code means which, when run by a processor "P" causes the radio network node 600 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the radio network node 600 in the form of a memory "M" having a computer readable medium and being connected to the processor P. The computer program product or memory M thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the radio network node 600.

Figure 7:
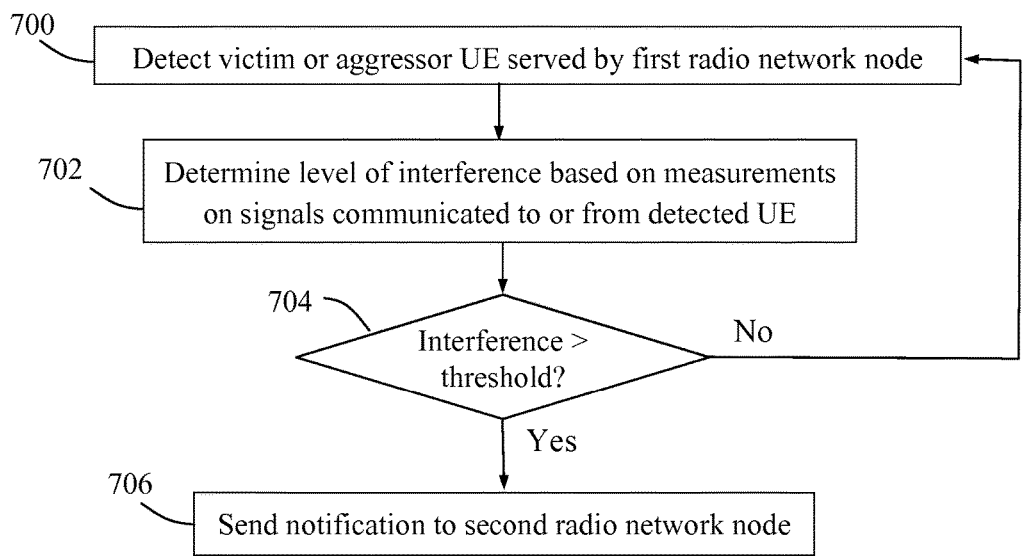
FIG. 7 is a flow chart illustrating another procedure in a radio network node according to further possible embodiments.

An example of a procedure with actions performed by the above-described first radio network node will now be described with reference to the flow chart in FIG. 7. A first action 700 illustrates that the first radio network node detects that a victim UE or an aggressor UE is served by the first radio network node, just as in action 500 above. The victim UE thus suffers from interference from transmissions from the aggressor UE during a flexible subframe, hence a UE to UE interference situation. A next action 702 illustrates that the first radio network node determines the level of this interference during the flexible subframe based on measurements of signals communicated to or from the detected UE. The first radio network node then determines, in a next action 704, whether the determined level of interference exceeds a certain threshold. In other words, it is determined whether the interference is harmful enough to justify acts and measures for alleviating the interference. If not, the procedure may return to action 700 and no interference mitigation action is performed. Thereby it is avoided that interference mitigation actions are performed in vain when it is not necessary or justified. If the threshold is exceeded, the first radio network node sends a notification to an identified second radio network node, in another action 706, to trigger it to execute an interference mitigation action, basically as described for actions 4:3 and 504 above which is not necessary to repeat here.

Figure 8:
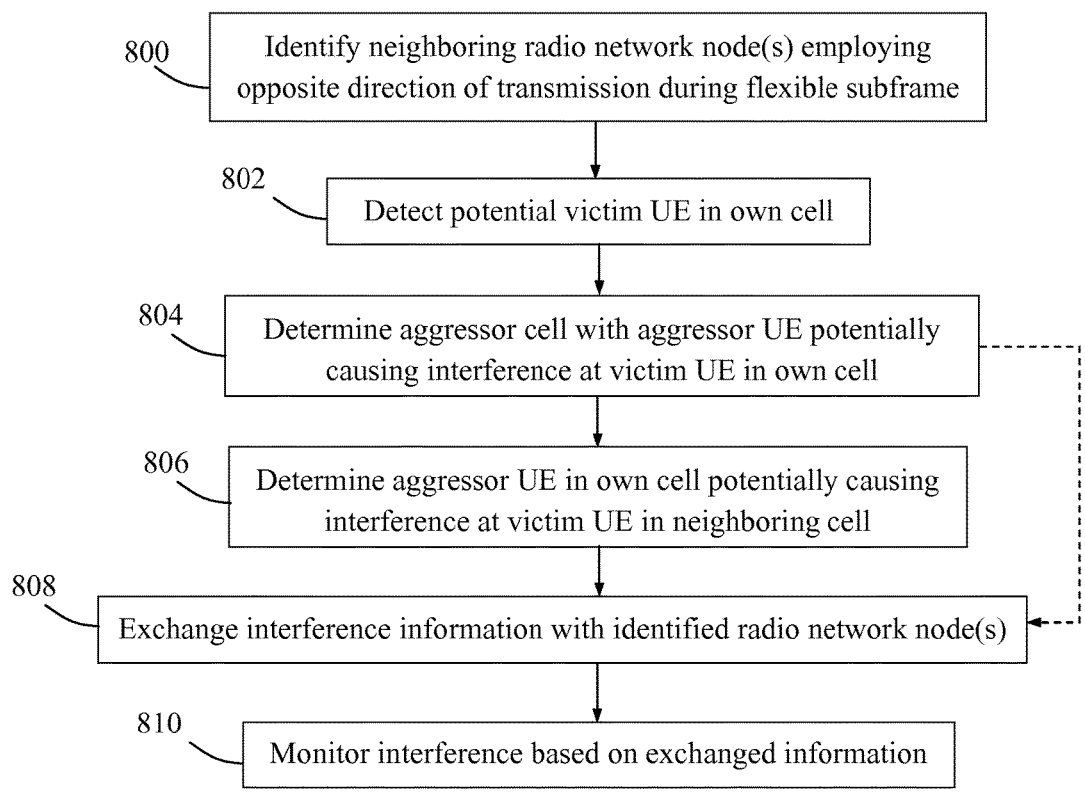
FIG. 8 is a flow chart illustrating another procedure in a radio network node according to further possible embodiments.

Another example of a procedure with actions performed by a first radio network node serving a first cell and employing one or more flexible subframes, will now be described with reference to the flow chart in FIG. 8. This example illustrates how neighbouring radio network nodes can cooperate and exchange interference information which can be used as a basis for alleviating UE to UE interference across two adjacent cells.

A first action 800 illustrates that the first radio network node identifies a set of neighbouring radio network nodes which employ a direction of signal transmission during the flexible subframe that is opposite to the direction of signal transmission employed by the first radio network node during the flexible subframe. Thereby, uplink transmissions by an aggressor UE may cause interference in a victim UE during such a flexible subframe. As mentioned above, the first radio network node may maintain a list of neighbouring radio network nodes which are located close enough to the first cell to potentially cause or suffer from the above-described UE to UE inter-cell interference, and which nodes may e.g. use a TDD subframe configuration different than the one used by the first radio network node.

Another action 802 illustrates that the first radio network node detects a potential victim UE in the own first cell. The first radio network node then determines, in another action 804, an aggressor cell in which an aggressor UE is potentially causing severe, i.e. harmful, interference at the victim UE in the first cell. This means that the aggressor UE transmits uplink signals in the same flexible subframe as the victim UE receives downlink signals. Another action 806 illustrates that the first radio network node may also determine that an aggressor UE is present in the first cell potentially causing severe interference at a victim UE in a neighbouring second cell. However, this action may be omitted in this example as indicated by the dashed arrow.

Another action 808 illustrates that the first radio network node exchanges interference information, i.e. information relating to any of the above aggressor and victim UEs, with the neighbouring radio network nodes identified in action 800. Such information may be exchanged over an X2 interface between the nodes in the case of LTE. It should be noted that exchanging the interference information may include sending the information about aggressor and victim UEs determined in actions 802-806 and also receiving similar interference information from one or more of the other neighbouring radio network nodes identified in action 800. A final action 810 illustrates that the first radio network node then monitors interference, at least during the flexible subframe, in the own cell, i.e. the first cell, e.g. for any victim UE and/or aggressor UE present in the own cell, based on the exchanged interference information which may include any sent information or received information, or both. The outcome of executing the actions above in FIG. 8 may then be used for triggering or executing an interference mitigation action, if necessary, e.g. as described for any of FIGS. 4-7.

Figure 9:
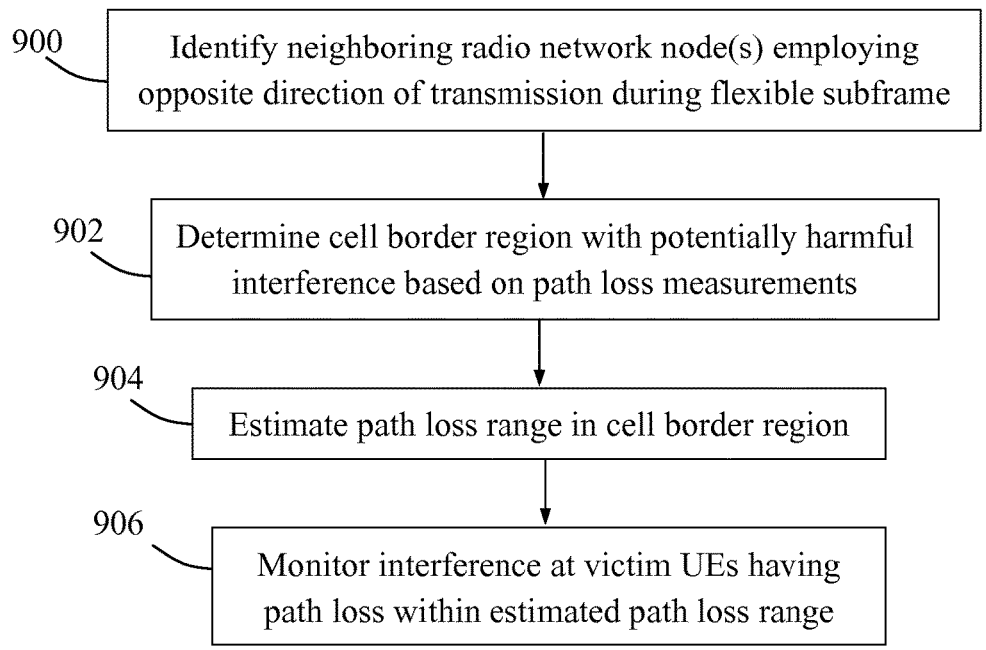
FIG. 9 is a flow chart illustrating another procedure in a radio network node according to further possible embodiments.

Yet another example of a procedure with actions performed by a first radio network node serving a first cell and employing a subframe scheme with a flexible subframe, will now be described with reference to the flow chart in FIG. 9. This example illustrates that path loss measurements can be used for determining a cell border region in the first cell. A first action 900 illustrates that the first radio network node identifies a set of neighbouring radio network nodes as employing a direction of signal transmission during the flexible subframe that is opposite to the direction of signal transmission employed by the first radio network node during the flexible subframe, which action may be the same as action 800 above. A next action 902 illustrates that the first radio network node determines the cell border region with potentially severe interference based on path loss measurements. Such path loss measurements may be performed e.g. in the manner described for the possible embodiments discussed after describing FIG. 5 above.

The first radio network node then estimates, in another action 904, a path loss range in the determined cell border region. A final action 906 illustrates that the first radio network node then monitors interference, at least during the flexible subframe, at victim UEs having path loss within the path loss range estimated in action 904. Some detailed examples of how the path loss range can be estimated will now be described.

The first radio network node thus determines the region of the first cell where such UE to UE interference can potentially be harmful. Therefore, the first radio network node acquires and maintains information related to uplink (UL) and/or downlink (DL) path loss between UEs served by the first radio network node and the first radio network node when the UEs are located in a cell border region, also referred to as a cell change region, which is in an area between the first radio network node and a second radio network node, i.e. where UEs perform cell change, e.g. handover, to a second cell of the second radio network node. This may be determined based on an UL or DL path loss estimate at the time when a UE, e.g. the first UE, performs or triggers a cell change to the second cell. In this way, the first radio network node may estimate a path loss range corresponding to the cell border region between the present serving cell, i.e. the first cell, and the neighboring cell, i.e. the second cell.

According to long time statistics of an RSRP report when a handover action is triggered, the first radio network node may make a corresponding cell edge path loss table for each neighboring cell, or at least for its closest neighboring cell. This may be done in a more or less continuous manner "in the background", i.e. without affecting normal operation of the first radio network node. The first radio network node may further use the above-described additional measurements for determining path loss when a UE, e.g. the first UE, is in the cell border region or when a cell change is triggered. For example, using the above measurements obtained and/or performed by the first radio network node, the first radio network node may maintain the information of border region between first and second radio network node in terms of at least path loss ranges and directions, e.g. in the form of a lookup table. The information may be updated with new measurement statistics to account for any change in TDD configuration, cell planning etc.

The first radio network node may monitor whether any first UE, i.e. any UE served by the first radio network node, is located in a region of the first cell where UE to UE interference may be harmful. To achieve this objective, the first radio network node may obtain measurements from the first UE on received downlink signals, and/or the first radio network node may itself perform "online" measurements on received uplink signals as follows.

The first radio network node monitors path loss, PL, of a plurality of first UEs and observes if that path loss lies in the range determined as above. The first radio network node may estimate the path loss based on existing measurements. For example, it can use the maximum transmit power $P_{tx,Max}$, the power headroom PH and an estimated uplink beam forming gain $P_{rx}$ to estimate the uplink path loss $PL_{UL}$, by means of equation 1:

$$PL_{UL}=P_{rx}-(P_{tx,Max}-PH) \quad (1)$$

The first radio network node may also use the RSRP measurement performed on Cell Reference Signals, CRS sent from first radio network node and the first radio network node's CRS transmit power $P_{CRS}$ to determine the downlink pathloss $PL_{DL}$, e.g. by means of equation 2:

$$PL_{DL}=P_{CRS}-RSRP \quad (2)$$

The first radio network node also uses the reported DoA from the first UEs, i.e. UEs served by the first radio network node, and/or the estimated AoA for the first UEs.

The first radio network node then compares the above online measurements for the first UEs with the lookup table with the PL and/or direction information obtained previously. If the first radio network node determines that the online measurements match with the lookup table, i.e. fall within the path loss range corresponding to the cell border region for any of the first UEs, then the first radio network node may conclude that there is potential UE to UE interference between the first UE and any second UEs served by the second radio network node that are also located in the cell border region. This may trigger a notification to the neighbouring radio network node, in this case the second radio network node, which may be regarded as a UE to UE interference alarm or warning message for the first UE at the first radio network node.

Upon detecting the UE to UE interference due to dynamic TDD configuration with flexible subframes for the first UE, the first radio network node may transmit the notification to one or more second radio network nodes. The first radio network node may also receive similar information from the second radio network node since each of the first radio network nodes upon detecting the UE to UE interference sends the corresponding information to a neighboring radio network node such as the one or more second radio network nodes, e.g. between eNBs over X2 in LTE. The additional information may also indicate the specific UL and/or DL subframes in which the first UE is typically scheduled by the first radio network node. It may also indicate whether the first UE might be an aggressor UE or a victim UE, or both. The information exchanged between first and second radio network nodes can thus be used by each node to determine if there is UE to UE interference, i.e. if there are first and second UEs present in a common cell border region, and also to determine the strength or severity level of the interference as explained below.

If the first radio network node receives an alarm for at least one second UE from a second or neighboring radio network node, then the first radio network node may conclude that there is UE to UE interference between the first and second UEs. In another example, the first radio network node may determine the severity level of the UE to UE interference. This can be done by comparing the path loss difference between the first and the second UEs with one or more predefined thresholds. This may be explained by the following example of triggering alarms using multiple thresholds:

No UE to UE interference alarm is triggered when Equation 3 below is fulfilled:

$$|PL_{meas-UE1}-PL_{translated-UE2}| \geq \beta \quad (3)$$

A medium UE to UE interference alarm is triggered when Equation 4 below is fulfilled:

$$\alpha \leq |PL_{meas-UE1}-PL_{translated-UE2}| < \beta \quad (4)$$

A high UE to UE interference alarm is triggered when Equation 5 below is fulfilled:

$$|PL_{meas-UE1}-PL_{translated-UE2}| < \alpha \quad (5)$$

where $\alpha$ and $\beta$ are low and high PL difference thresholds, respectively, $PL_{meas-UE1}$ is the measured path loss for the first UE and $PL_{translated-UE2}$ is the expected path loss between the first radio network node and the second UE assuming second UE was served by the first radio network node (i.e. neighboring radio network node relative the second radio network node that serves the second UE).

The expected path loss may be obtained by the translation which may be done either by the first or the second radio network node. For example, the first radio network node may send $PL_{meas-UE1}$ and AoA or DoA information for each first UE to second radio network nodes. The second radio network node may use the received information and a pre-defined map which maps the PL of a UE from first radio network node to the PL of the same UE from the second radio network node. Alternatively, each of the first radio network nodes may do the same translation for a neighboring second radio network node and signal the translated PL (i.e. the PL relevant for the second radio network node for determining UE to UE interference) to the neighboring second radio network nodes.

Figure 10:
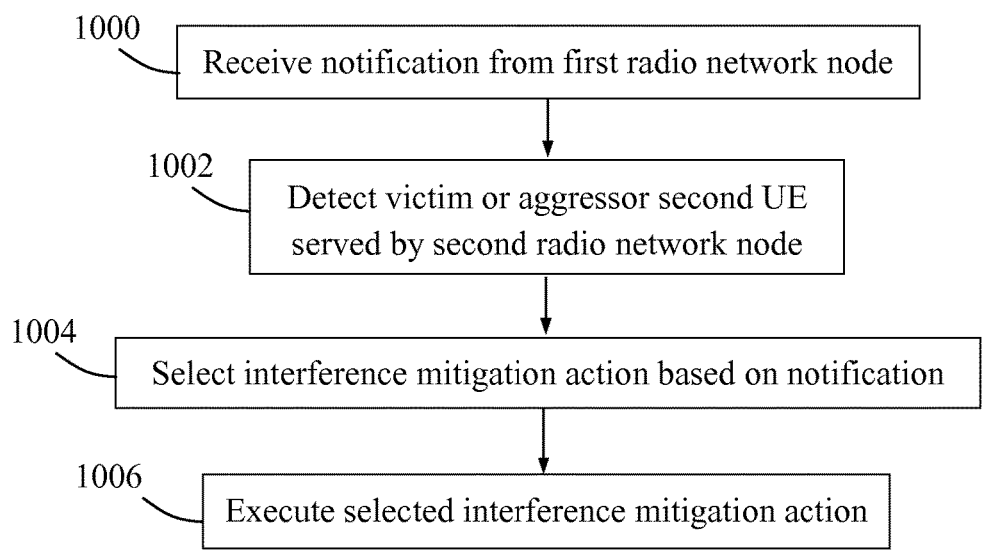
FIG. 10 is a flow chart illustrating a procedure in a second radio network node, according to further possible embodiments.

A procedure with actions performed by a second radio network node in a radio communication network where subframes are transmitted in pre-determined positions within radio frames, for alleviating interference on downlink radio signals received by a victim UE in a victim cell, will now be described with reference to the flow chart in FIG. 10. In this network, a first radio network node employs a subframe scheme where at least one of the pre-determined positions is allocated to a flexible subframe in which the direction of signal transmission is variable between uplink and downlink from one radio frame to another. The interference is caused by transmission of uplink radio signals from an aggressor UE in an aggressor cell during the flexible subframe, i.e. in a subframe that overlaps at least partly in time with the flexible subframe. The first radio network node may be the node BS1 and the second radio network node may be the node BS2 in FIG. 4.

In a first action 1000, the second radio network node receives a notification from the first radio network node. The received notification indicates that an uplink transmission from the aggressor UE potentially overlaps at least partly with downlink reception in the victim UE during the flexible subframe, and that a first UE, e.g. T1 in FIG. 4, being one of the victim and aggressor UEs, is served by the first radio network node. In a next action 1002, the second radio network node detects that a second UE, e.g. T2 in FIG. 4, being the other one of the victim and aggressor UEs, is served by the second radio network node.

A further action 1004 illustrates that the second radio network node selects an interference mitigation action for the detected second UE based on the received notification. Finally, an action 1006 illustrates that the second radio network node executes the selected interference mitigation action.

It is possible to perform the above procedure and actions in different optional ways. In a possible embodiment, the interference mitigation action may be selected and executed when a level of the interference during the flexible subframe is higher than a threshold based on measurements of signals communicated to or from the second UE. In another possible embodiment, the second UE may be detected when it is located in a cell border region of a second cell of the second radio network node adjacent to a first cell of the first radio network node.

In yet an embodiment, the selection of the interference mitigation action may further be based on at least one of: reception quality in the victim UE, user throughput, system throughput, and receiver capabilities of the second UE. Further, the selected interference mitigation action may comprise any of: scheduling the second UE on an interference protected radio resource, and avoiding to schedule the second UE during the flexible subframe. In this context, an "interference protected" radio resource is understood as a radio resource, e.g. a subframe which is not used for scheduling any other potentially interfering UE at the same time and frequency.

In further possible embodiments, when the second UE is the victim UE receiving downlink radio signals with data during the flexible subframe, the selected interference mitigation action may comprise at least one of:

instructing the second UE to apply multiple loop downlink channel filtering or multiple loop downlink link adaptation,
increasing transmission power,
using a more robust modulation scheme,
using a more robust coding scheme,
using a more robust transport format, and
instructing the second UE to use a more robust receiver.

Alternatively, when the second UE is the aggressor UE sending uplink radio signals with data during the flexible subframe, the selected interference mitigation action may comprise instructing the second UE to reduce its transmission power. In another possible embodiment, the interference mitigation action may comprise sending the notification to the second UE to instruct the second UE to execute an interference mitigation action. It should be noted that this notification may or may not be the same notification as the notification sent from the first radio network node to the second radio network node in the preceding examples described above. They are at least different types of message communicated over different interfaces using different protocols although the notification sent to the second UE in this case may contain, or imply, at least partly the same information as the notification sent to the second radio network node.

Figure 11:
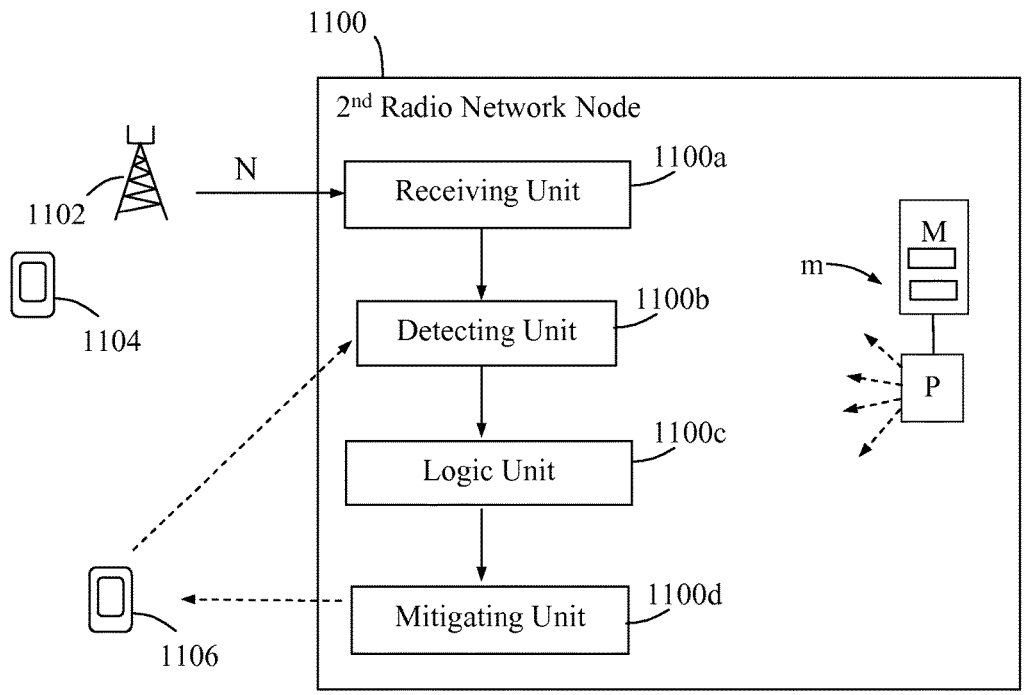
FIG. 11 is a block diagram illustrating a second radio network node in more detail, according to further possible embodiments.

A detailed but non-limiting example of how a second radio network node in a radio communication network may be arranged to accomplish the above-described embodiments, is illustrated by the block diagram in FIG. 11. It is assumed that subframes are transmitted in pre-determined positions within radio frames, and that a first radio network node 1102 in the network employs a subframe scheme where at least one of the pre-determined positions is allocated to a flexible subframe in which the direction of signal transmission is variable between uplink and downlink from one radio frame to another. The second radio network node 1100 is configured to alleviate interference on downlink radio signals received by a victim UE in a victim cell. The interference is caused by transmission of uplink radio signals from an aggressor UE in an aggressor cell during the flexible subframe.

The second radio network node comprises a receiving unit 1100a configured to receive a notification "N" from the first radio network node 1102. The received notification N indicates that an uplink transmission from the aggressor UE potentially overlaps at least partly with downlink reception in the victim UE during the flexible subframe, and that a first UE (1104), being one of the victim and aggressor UEs, is served by the first radio network node.

The second radio network node also comprises a detecting unit 1100b configured to detect that a second UE 1106, being the other one of the victim and aggressor UEs, is served by the second radio network node 1100. The second radio network node also comprises a logic unit 1100c configured to select an interference mitigation action for the detected second UE based on the received notification, and a mitigating unit 1100d configured to execute the selected interference mitigation action.

The logic unit 1100c may further be configured to select the interference mitigation action to be executed when a level of the interference during the flexible subframe is higher than a threshold based on measurements of signals communicated to or from the second UE. The detecting unit 1100b may further be configured to detect the second UE (1106) when it is located in a cell border region of the second radio network node adjacent to a cell of the first radio network node. The logic unit 1100c may further be configured to select the interference mitigation action based on at least one of: reception quality in the victim UE, user throughput, system throughput, and receiver capabilities of the second UE. The second radio network node 1100 may be configured to operate according to any of the further embodiments described for FIG. 10 above.

Figure 12:
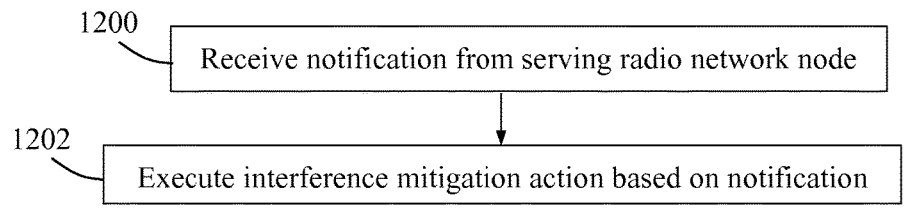
FIG. 12 is a flow chart illustrating a procedure in a UE, according to further possible embodiments.

A procedure with actions performed by a user equipment, UE, for alleviating interference on downlink radio signals received by a victim UE in a victim cell, will now be described with reference to the flow chart in FIG. 12. The UE is being served by a serving radio network node in a radio communication network where subframes are transmitted in pre-determined positions within radio frames, wherein at least one of the serving radio network node and a neighbouring radio network node in the radio communication network employs a subframe scheme where at least one of the pre-determined positions is allocated to a flexible subframe in which the direction of signal transmission is variable between uplink and downlink from one radio frame to another. The interference is caused by transmission of uplink radio signals from an aggressor UE in an aggressor cell during the flexible subframe. The UE in this example may e.g. be any of the UEs T1, T2, 1104 and 1106 in FIGS. 4 and 11, respectively.

In a first action 1200, the UE receives a notification from the serving radio network node, which notification indicates that the UE is one of the victim and aggressor UEs. In a next action 1202, the UE executes an interference mitigation action based on the received notification. It has been mentioned above that a notification sent to a UE may or may not be the same as the notification sent from one radio network node to another radio network node according to some embodiments herein. Thus, the notification sent to the UE in this case may contain, or imply, at least partly the same information as the notification sent from the first radio network node to the second radio network node in the previous examples.

In some possible embodiments, the interference mitigation action may comprise decreasing transmission power when the notification indicates that the UE is the aggressor UE, in order to cause less interference at the victim UE. The interference mitigation action may further comprise selecting a more robust receiver when the notification indicates that the UE is the victim UE, which receiver is capable of receiving and decoding signals from the serving radio network node in spite of relatively high interference from the aggressor UE.

Figure 13:
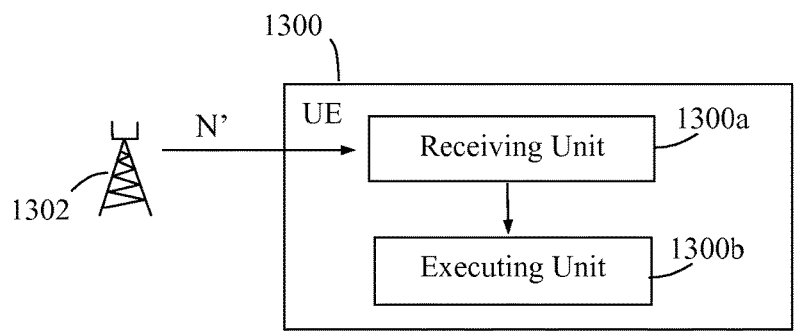
FIG. 13 is a block diagram illustrating a UE in more detail, according to further possible embodiments.

A detailed but non-limiting example of how a UE may be arranged to accomplish the above-described method, is illustrated by the block diagram in FIG. 13. The UE 1300 is configured to be served by a serving radio network node 1302 in a radio communication network where subframes are transmitted in pre-determined positions within radio frames, wherein at least one of the serving radio network node and a neighbouring radio network node in the radio communication network employs a subframe scheme where at least one of the pre-determined positions is allocated to a flexible subframe in which the direction of signal transmission is variable between uplink and downlink from one radio frame to another. The UE 1300 is further configured to alleviate interference on downlink radio signals received by a victim UE in a victim cell, which interference is caused by transmission of uplink radio signals from an aggressor UE in an aggressor cell during the flexible subframe.

The UE 1300 comprises a receiving unit 1300a that is configured to receive a notification N' from the serving radio network node, which notification N' indicates that the UE is one of the victim and aggressor UEs. This notification is denoted N' to distinguish it from the above-described notification N sent between radio network nodes. The UE 1300 also comprises an executing unit 1300b that is configured to execute an interference mitigation action based on the received notification N'. In accordance with what was described for FIG. 12 above, the executing unit 1300b may be configured to execute the interference mitigation action by decreasing transmission power when the notification N' indicates that the UE is the aggressor UE, or by selecting a more robust receiver when the notification N' indicates that the UE is the victim UE.

While the solution has been described with reference to specific exemplary embodiments, the description is generally only intended to illustrate the inventive concept and should not be taken as limiting the scope of the solution. For example, the terms "radio network node", "User Equipment, UE", "aggressor", "victim" and "interference mitigation action" have been used throughout this description, although any other corresponding entities, functions, and/or parameters could also be used having the features and characteristics described here. The solution is defined by the appended claims.

The invention claimed is:

1. A method, performed by a first radio network node in a radio communication network where subframes are transmitted in pre-determined positions within radio frames, wherein the first radio network node employs a subframe scheme where at least one of the pre-determined positions is allocated to a flexible subframe in which the direction of signal transmission is variable between uplink and downlink from one radio frame to another, for triggering mitigation of interference on downlink radio signals received by a victim User Equipment, UE, in a victim cell, said interference being caused by transmission of uplink radio signals from an aggressor UE in an aggressor cell during the flexible subframe, the method comprising:

detecting that a first UE, being one of the victim and aggressor UEs, is served by the first radio network node within a first cell, wherein the first UE is located in a border region of the first cell of the first radio network node, identifying a second radio network node which employs a subframe scheme such that an uplink transmission from the aggressor UE potentially overlaps at least partly with downlink reception at the victim UE during the flexible subframe, and sending a notification to the identified second radio network node, the notification indicating the flexible subframe and the first UE being served by the first radio network node, to trigger the second radio network node to execute an interference mitigation action for alleviating said interference when a second UE, being the other one of the victim and aggressor UEs, is served by the second radio network node within a second cell during the flexible subframe, wherein the second UE is located in a border region of the second cell is adjacent to the border region of the first cell, and the first cell and the second cell are neighbor cells.

2. The method according to claim 1, wherein the subframe scheme employed by the second radio network node comprises a flexible subframe that overlaps at least partly in time with the flexible subframe of the first radio network node.

3. The method according to claim 1, wherein the notification is sent after determining that a level of said interference during the flexible subframe is higher than a threshold based on measurements of signals communicated to or from the first UE.

4. The method according to claim 1, wherein the border region of the first cell is determined based on measurements of path loss between UEs served by the first radio network node.

5. The method according to claim 4, wherein the determination of the border region of the first cell is further based on additional measurements regarding the UEs served by the first radio network node, the additional measurements comprising measurements of at least one of:

power headroom, transmit power, received signal strength, angle/direction of arrival, timing advanced, and one way propagation delay.

6. The method according to claim 1, wherein a set of neighbouring radio network nodes are identified which employ a direction of signal transmission during the flexible subframe that is opposite to the direction of signal transmission employed by the first radio network node during the flexible subframe, and further comprising sending the notification to one or more radio network nodes in the set of identified neighbouring radio network nodes.

7. The method according to claim 1, wherein when the first UE is the aggressor UE transmitting uplink radio signals with data during the flexible subframe, the first radio network node executes an interference mitigation action for alleviating said interference, the interference mitigation action comprising at least one of:

scheduling low data rate to the first UE in the uplink,
decreasing transmission power of the first UE,
using a more robust modulation scheme for the first UE,
using a more robust coding scheme for the first UE, and
using a more robust transport format for the first UE.

8. A first radio network node in a radio communication network where subframes are transmitted in pre-determined positions within radio frames, the first radio network node being configured to employ a subframe scheme where at least one of the pre-determined positions is allocated to a flexible subframe in which the direction of signal transmission is variable between uplink and downlink from one radio frame to another, and to trigger mitigation of interference on downlink radio signals received by a victim User Equipment, UE, in a victim cell, said interference being caused by transmission of uplink radio signals from an aggressor UE in an aggressor cell during the flexible subframe, the first radio network node comprising a memory for storing instructions, the instructions, when executed by a processor, operable to:
  detect that a first UE, being one of the victim and aggressor UEs, is served by the first radio network node within a first cell, wherein the first UE is located in a border region of the first cell of the first radio network node,
  identify a second radio network node which employs a subframe scheme such that an uplink transmission from the aggressor UE potentially overlaps at least partly with downlink reception at the victim UE during the flexible subframe, and
  send a notification to the identified second radio network node, the notification indicating the flexible subframe and the first UE being served by the first radio network node, to trigger the second radio network node to execute an interference mitigation action for alleviating said interference when a second UE, being the other one of the victim and aggressor UEs, is served by the second radio network node within a second cell during the flexible subframe, wherein the second UE is located in a border region of the second cell of the second radio network node, wherein the border region of the second cell is adjacent to the border region of the first cell, and the first cell and the second cell are neighbor cells.

9. The first radio network node according to claim 8, wherein the instructions, when executed by the processor, are further operable to send the notification after it has been determined that a level of said interference during the flexible subframe is higher than a threshold based on measurements of signals communicated to or from the first UE.

10. The first radio network node according to claim 8, wherein the instructions, when executed by the processor, are further operable to determine the border region of the first cell based on measurements of path loss between UEs served by the first radio network node and the first radio network node.

11. The first radio network node according to claim 10, wherein the instructions, when executed by the processor, are further operable to determine the border region of the first cell based on additional measurements regarding the UEs served by the first radio network node, the additional measurements comprising measurements of at least one of: power headroom, transmit power, received signal strength, angle/direction of arrival, timing advanced, and one way propagation delay.

12. The first radio network node according to claim 8, wherein the instructions, when executed by the processor, are further operable to:
  identify a set of neighbouring radio network nodes which employ a direction of signal transmission during the flexible subframe that is opposite to the direction of signal transmission employed by the first radio network node during the flexible subframe, and
  send the notification to one or more radio network nodes in the set of identified neighbouring radio network nodes.

13. The first radio network node according to claim 8, wherein the instructions, when executed by the processor, are further operable to, when the first UE is the aggressor UE transmitting uplink radio signals with data during the flexible subframe, execute an interference mitigation action for alleviating said interference, the interference mitigation action comprising at least one of:
  scheduling low data rate to the first UE in the uplink,
  decreasing transmission power of the first UE,
  using a more robust modulation scheme for the first UE,
  using a more robust coding scheme for the first UE, and
  using a more robust transport format for the first UE.

14. A second radio network node in a radio communication network where subframes are transmitted in pre-determined positions within radio frames, wherein a first radio network node in the radio communication network employs a subframe scheme where at least one of the pre-determined positions is allocated to a flexible subframe in which the direction of signal transmission is variable between uplink and downlink from one radio frame to another, the second radio network node being configured to alleviate interference on downlink radio signals received by a victim User Equipment, UE, in a victim cell, said interference being caused by transmission of uplink radio signals from an aggressor UE in an aggressor cell during the flexible subframe, the second radio network node comprising a memory for storing instructions, the instructions, when executed by a processor, operable to:
  receive a notification from the first radio network node, the notification indicating that an uplink transmission from the aggressor UE potentially overlaps at least partly with downlink reception in the victim UE during the flexible subframe, and that a first UE, being one of the victim and aggressor UEs, is served by the first radio network within a first cell, wherein the first UE is located in a border region of the first cell of the first radio network node,
  detect that a second UE, being the other one of the victim and aggressor UEs, is served by the second radio network node within a second cell, wherein the second UE is located in a border region of the second cell of the second radio network node, wherein the border region of the second cell is adjacent to the border region of the first cell, and the first cell and the second cell are neighbor cells,
  select an interference mitigation action for the detected second UE based on the received notification, and
  execute the selected interference mitigation action.

15. The second radio network node according to claim 14, wherein the selected interference mitigation action comprises at least one of:
  scheduling the second UE on an interference protected radio resource,
  avoiding to schedule the second UE during the flexible subframe,
  instructing the second UE to apply multiple loop downlink channel filtering or multiple loop downlink link adaptation,
  increasing transmission power, using a more robust modulation scheme,
using a more robust coding scheme,
using a more robust transport format, and
instructing the second UE to use a more robust receiver.

16. The second radio network node according to claim 14, wherein when the second UE is the aggressor UE sending uplink radio signals with data during the flexible subframe, the selected interference mitigation action comprises at least one of:
- instructing the second UE to reduce its transmission power, and
- sending a notification to the second UE to instruct the second UE to execute an interference mitigation action.

17. A User Equipment, UE, configured to be served by a serving radio network node in a radio communication network where subframes are transmitted in pre-determined positions within radio frames, wherein at least one of the serving radio network node and a neighbouring radio network node in the radio communication network employs a subframe scheme where at least one of the pre-determined positions is allocated to a flexible subframe in which the direction of signal transmission is variable between uplink and downlink from one radio frame to another, and configured to alleviate interference on downlink radio signals received by a victim UE in a victim cell, said interference being caused by transmission of uplink radio signals from an aggressor UE in an aggressor cell during the flexible subframe, the UE comprising a memory for storing instructions, the instructions, when executed by a processor, operable to:
- receive a notification from the serving radio network node, which notification indicates that the UE is one of the victim and aggressor UEs, when the victim UE is located in a border region of the victim cell and the aggressor UE is located in a border region of the aggressor cell, and the border region of the aggressor cell is adjacent to the border region of the victim cell and the victim cell and the aggressor cell are neighbor cells, and
- execute an interference mitigation action based on the received notification.

18. The UE according to claim 17, wherein the instructions, when executed by the processor, are operable to execute the interference mitigation action by any of:
- decreasing transmission power when the notification indicates that the UE is the aggressor UE, and
- selecting a more robust receiver when the notification indicates that the UE is the victim UE.

* * * * *